US006562312B2

(12) United States Patent
Cronin et al.

(10) Patent No.: US 6,562,312 B2
(45) Date of Patent: May 13, 2003

(54) PROCESS FOR CONTROLLING THE PASSIVATION OF ALUMINUM CHLORIDE FORMED IN THE CHLORINATION OF TITANIUM-CONTAINING ORES

(75) Inventors: James Timothy Cronin, Townsend, DE (US); Thomas Shields Elkins, Waverly, TN (US); Hans Hellmut Glaeser, Wilmington, DE (US); Lisa Edith Helberg, Middletown, DE (US); Angela Ruth Strzelecki, Boothwyn, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 49 days.

(21) Appl. No.: 09/739,597

(22) Filed: Dec. 18, 2000

(65) Prior Publication Data

US 2001/0016182 A1 Aug. 23, 2001

Related U.S. Application Data

(63) Continuation-in-part of application No. 09/346,410, filed on Jul. 1, 1999, now abandoned.

(51) Int. Cl.$^7$ ............................................... C01G 23/02
(52) U.S. Cl. ....................................... 423/472; 423/492
(58) Field of Search ................................. 423/472, 492

(56) References Cited

U.S. PATENT DOCUMENTS 2,600,881 A   6/1952   Kay et al. ..................... 202/57
4,070,252 A   1/1978   Bonsack ....................... 203/29
4,125,586 A   11/1978   Glaeser ......................... 423/84

OTHER PUBLICATIONS

T. A. Zavaritskaya, I. A. Zevakin, Methods For Removing Titanium Oxychloride From Titanium Tetrachloride, *Tr. Vses. Nauchn. Issled. Alyumin. Magnievyi Inst.*, 47, 85–90, 1961.

Milan Milosevic, Donald Sting, Alan Rein, The Diamond Composite Sensor—Robust Technology for ATR Spectroscopy, *ASI Applied Systems*, 1–9, no date available.

N. K. Druzhinina, Some Studies Of The $AlCl_3$–$TiCl_4$–$H_2O$ System, *Tr. Vses. Nauchn. Issled. Alyumin–Magnievyi Inst.*, 50, 147–52, 1963.

T. A. Zavaritskaya, D. I. Tsekhovolskaya, Determination Of Titanium Oxychloride In Titanium Tetrachloride, *Journal of Applied Chemistry (U.S.S.R.)*, 33, 2106–2107, 1960.

V. V. Korolev, E. F. Timofeev, N. T. Shokina, Filter–Type Analyzer For Continuous Impurity Monitoring For Flowing Titanium Tetrachloride, *Journal of Applied Spectroscopy*, 22, 116–118, 1975.

*Primary Examiner*—Tom Dunn
*Assistant Examiner*—Christina Ildebrando

(57) ABSTRACT

The present invention is a process for controlling, at an aim point, the passivation of aluminum chloride in the chlorinator discharge stream in a process for making titanium tetrachloride.

5 Claims, 1 Drawing Sheet

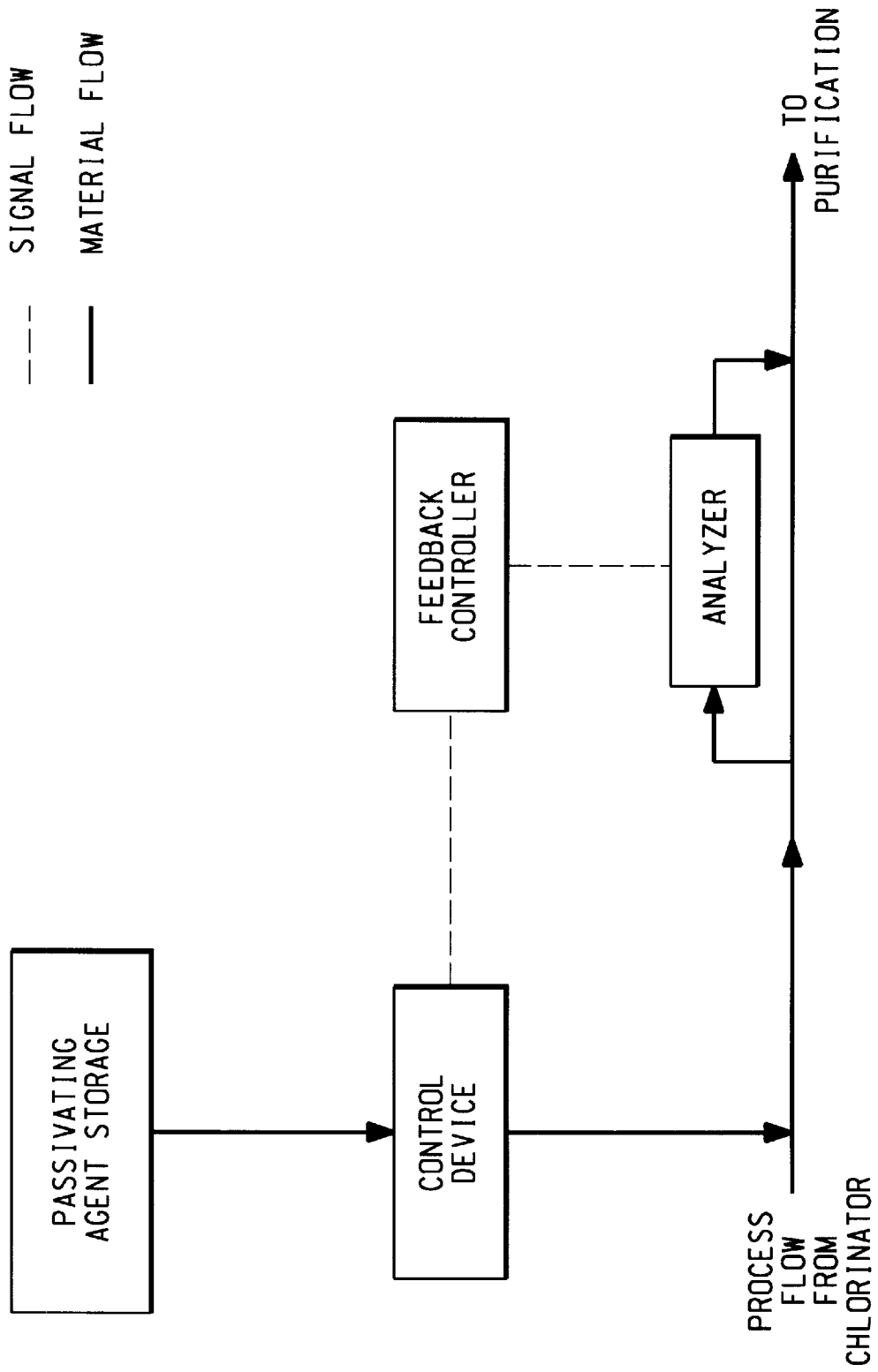
FIGURE

PROCESS FOR CONTROLLING THE PASSIVATION OF ALUMINUM CHLORIDE FORMED IN THE CHLORINATION OF TITANIUM-CONTAINING ORES

BACKGROUND OF THE INVENTION

In the production of titanium tetrachloride, raw materials, including ilmenite or rutile ores or other titanium-rich materials such as those obtained from beneficiating these ores, are reacted with chlorine under reducing conditions to yield a mixture of metal chlorides from which titanium tetrachloride may be recovered.

Aluminum chloride is present in the chlorination product of practically every case where aluminum compounds are present in the raw materials. Aluminum chloride present in the crude titanium tetrachloride is a highly corrosive material. It both quickly and severely attacks the metal materials of construction in the purification systems.

Prior art has taught methods by which aluminum chloride present in the crude titanium tetrachloride may be passivated, meaning the aluminum chloride is converted to a less corrosive or non-corrosive compound.

U.S. Pat. No. 2,600,881 to Kay and Rick teaches the addition of water to the crude titanium tetrachloride. According to this patent, water is added in an amount that is sufficient to react with only the aluminum chloride present in the crude titanium tetrachloride. Water reacts with the aluminum chloride and converts it to a less volatile, non-corrosive hydrate or oxychloride. Although this patent teaches a method of passivating the aluminum chloride, there continued to be a major disadvantage. If water was added in excess of that amount just sufficient to remove the aluminum chloride, the excess water reacted with the titanium tetrachloride converting it to hydrolysis products resulting in losses of titanium value. This patent offered no teaching or suggestion as to how to avoid the addition of excess water or how to accommodate the variations in aluminum chloride content of crude titanium tetrachloride that may be experienced in a continuous industrial process.

It was reported in U.S. Pat. No. 4,125,586 to Glaeser that to successfully apply the method taught in U.S. Pat. No. 2,600,881 on a commercial scale required that at least 10% excess water be added in order to effectively passivate the aluminum chloride. As an improvement to reduce losses of titanium value, U.S. Pat. No. 4,125,586 taught that loss in titanium value could be essentially eliminated by adding a mixture of water and sodium chloride to the crude titanium tetrachloride. The water addition was made in an amount less than that needed to convert all the aluminum chloride present to aluminum oxychloride; but the sum of the total amounts of water and sodium chloride added was in excess of that amount needed to react with the aluminum chloride present.

While U.S. Pat. No. 4,125,586 was an improvement, there was still the need to have a method that could control passivation of aluminum chloride present in the crude titanium tetrachloride at a process aim point reducing both the losses of titanium value and the corrosion.

U.S. Pat. No. 4,070,252 to Bonsack teaches a method for separating niobium and/or tantalum chlorides from a liquid crude titanium tetrachloride vehicle by adding water to the crude titanium tetrachloride vehicle in a portion not substantially above 1 mole per mole of these chlorides. Bonsack teaches that the addition of water in his process may be made before or after the chlorination reaction.

Even in view of the teachings of the art cited above, an accurate, in-process control method was needed that could respond to the demands of continuous plant operation where there are variations in the aluminum chloride content of the crude titanium tetrachloride due to (1) variations in the uniformity in the distribution of the aluminum containing minerals in the ore being processed; (2) variations in the rate at which ore is processed; (3) variations in aluminum content from one ore source to another; (4) variation in the content of mineral species other than those containing aluminum and titanium that consume the passivating agent; and (5) variation in the amount of aluminum chloride removed with any initial separation of higher boiling metal chlorides from the product titanium tetrachloride vapor.

SUMMARY OF THE INVENTION

An in-process, real time control loop capable of controlling the passivation of aluminum chloride formed in the chlorination of titanium-containing ores by monitoring titanium oxychloride present in passivated crude titanium tetrachloride comprising the steps:

(a) rapidly mixing into a chlorinator discharge stream, where the stream comprises predominately vapor in the presence of liquid mist and solids, an aluminum chloride-passivating agent to form in the process stream an essentially non-corrosive aluminum containing compound, and titanium oxychloride;

(b) measuring in-process the concentration of titanium oxychloride in the chlorinator discharge stream or in the crude titanium tetrachloride.

(c) comparing the measured concentration of titanium oxychloride to that of an aim point concentration of titanium oxychloride; and (d) adjusting the rate of addition of the aluminum chloride-passivating agent to restore or maintain the concentration of titanium oxychloride at the aim point.

The aluminum chloride-passivating agent is selected from the group consisting of water, water containing solutions, water containing mixtures, and carboxylic acids.

In the present process it is preferred to measure the concentration of titanium oxychloride by an optical method selected from the group consisting of transmission filter Infrared spectroscopy, transmission Fourier Transform Infrared spectroscopy, Raman spectroscopy, Attenuated Total Reflectance Infrared spectroscopy, and Attenuated Total Reflectance Fourier Transform Infrared spectroscopy.

It is also preferred that the measurement of the concentration of titanium oxychloride be made in a frequency range of from 800 to 2000 $cm^{-1}$.

It is most preferred that the concentration of titanium oxychloride is measured by diamond based Attenuated Total Reflectance Fourier Transform Infrared at a frequency of about 820 $cm^{-1}$.

BRIEF DESCRIPTION OF THE DRAWING

The FIGURE illustrates a control loop of the present invention.

DETAILED DESCRIPTION

The present invention is a process control loop capable of controlling, at an aim point, the passivation of aluminum chloride present in the chlorinator discharge stream in a process for making titanium tetrachloride. The phrase passivation of aluminum chloride as used herein means that the aluminum chloride is converted to a less corrosive or non-corrosive compound. The term "real-time" means actual time when the passivation is taking place in the process. Thus, the in-process, real-time control loop of the present invention provides a way to accurately passivate the corrosive aluminum chloride without the addition of water or another passivating agent in excess of that which is actually required to react with the aluminum chloride present at desired point of passivation.

The present process requires the addition of the passivating agent into a chlorinator discharge stream where the stream comprises predominately vapor along with liquid mist and solids. It is in this point of the process where mixing is rapid and the desired product selectivity can be achieved. If the addition of the passivation agent, particularly water, were made before the chlorination reaction, as is taught in Bonsack, the water would react with the chlorine and coke to produce hydrogen chloride gas and carbon dioxide destroying the agent. Under these conditions, aluminum chloride formed in the chlorinator would leave the chlorinator as an active (unpassivated) agent causing serious corrosion of equipment.

On the other hand, addition of the passivation agent down stream and into the chlorinator discharge where the product stream is predominately liquid may irreversibly produce titanium dioxide. This production of titanium dioxide represents a serious yield loss since it is separated from the titanium tetrachloride product stream along with coke and other waste product solids.

In the present invention, the point of addition of the passivation agent into the flow of the chlorinator product stream is optimized for (1) the reduction and elimination of corrosion from active aluminum chloride, (1) minimal yield losses of titanium tetra chloride, and (3) in a process stream in real-time.

The inventors in the present process have found that long exposure of titanium oxychloride in the liquid titanium tetrachloride under conditions, as is suggested by Bonsack and in the article by N. K. Druzhinina entitled Some Studies of the $AlCl_3$—$TiCl_4$—$H_2O$ System in *Tr.Vses. Issled.Alyumin-Magnievyi Inst*, no. 50:147-52(1963), produce an inactive titanium oxychloride polymer. That is, a polymer form of titanium oxychloride that does not back react according to the accepted reaction sequence such as is the sequence presented in Bonsack col. 2. The presence of this titanium oxychloride polymer will lead to a false indication in the measuring scheme of the present invention. That is, infrared spectra would record the presence of the titanium oxychloride polymer species at 820 $cm^{-1}$, while aluminum chloride is still present as an unpassified species in the product stream.

In the present process the aluminum chloride is made non-corrosive by reacting the aluminum chloride containing crude titanium tetrachloride with an aluminum chloride-passivating agent. The term aluminum chloride-passivating agent as used herein means an agent that reacts with the aluminum chloride to form a non-corrosive or essentially non-corrosive aluminum containing compound and also results in the production of titanium oxychloride. Passivating agents include water, water solutions, water containing mixtures, and carboxylic acids. For example, water solutions of sodium chloride or sodium hydroxide or water solutions or mixtures containing carboxylic acids are suitable as passivating agents for the aluminum chloride.

Although chemical theory offers some guidance in the selection of an aluminum chloride-passivating agent, one may screen passivating agents by adding the material in question, alone or as a solution or mixture in water, to titanium tetrachloride containing a known amount of aluminum chloride to form a treated sample. The concentration of aluminum chloride in the treated sample is then measured to determine the amount of aluminum chloride that has reacted and the amount of titanium oxychloride formed. The reduction in corrosion is determined by comparing the corrosion of the treated sample to that of a control using metal coupons. Selection of a passivating agent may also require such considerations as cost and the material's overall acceptability for an industrial process.

Water is most preferred as a passivating agent in the present process. Water solutions or mixtures may be used as passivating agents even if the materials other than the water show no reactivity towards the aluminum chloride. To realize the full potential of the present invention, it is clear that one must avoid the use of a material that causes instability (reaction to re-form aluminum chloride) in the non-corrosive aluminum compound formed, that uncontrollably depletes the titanium value of the crude titanium tetrachloride, or produces solid deposits on equipment surfaces.

The present invention is designed for use in-process. In the present control loop, it is preferred to place the addition of the aluminum chloride-passivating agent as near the point of titanium tetrachloride condensation where the product titanium tetrachloride and other metal chlorides are a mixture of vapor and liquid mist. Addition of the passivating agent at this point in the reaction both minimizes yield losses due to the formation of titanium dioxide and the formation of non-reactive polymer forms of $TiOCl_2$.

Although the mechanism of the reaction is not fully understood, the inventors have found that aluminum chloride is passivated and the extent of the passivation is indirectly indicated, and may be controlled by the monitoring the formation of titanium oxychloride. The inventors have found that when the aluminum chloride-passivation reaction is carried out in a vapor/liquid mist-containing phase with rapid mixing, the passivation rate is rapid—in fact, only limited by the rate of mass transfer—and the formation of titanium dioxide is avoided. Titanium oxychloride formed is a reactive species not a persistent species as long as aluminum chloride is present in the titanium tetrachloride.

The term chlorinator discharge stream means the product stream of the chlorinator as the streams leaves the chlorinator and enters into the titanium tetra condensation section of the process. This term also includes a process stream from the chlorinator where there has been some initial condensation of the higher boiling metal chlorides such as iron chloride. The essential feature of the present invention is that the addition of the passivating agent is made where the physical state of the chlorinator discharge stream is predominately vapor in the presence of liquid mist and solids.

Under conditions other than those of the present invention, yield losses due to the formation of titanium dioxide and excess titanium oxychloride are much greater, and at the same time there is no assurance that the aluminum chloride has been passivated since such conditions cause the formation of a non-reactive titanium oxychloride polymer species. Under the reaction conditions of the present invention, regardless of the amount of impurities that consume passivating agent, as long as $TiOCl_2$ is detected, all of the $AlCl_3$ has been passivated.

According to the process of the present invention, the presence of titanium oxychloride in the process stream indicates that the aluminum chloride has been passivated. Since titanium oxychloride is soluble in titanium tetrachloride at the process conditions that exist in the present process, the concentration of titanium oxychloride provides a means both to monitor and to control aluminum chloride passivation by in-process measurement.

The formation of titanium oxychloride represents a loss of titanium value; but solubility and detectability of this oxychloride provide a means to control the addition of water or another aluminum chloride-passivating agent to an amount that is only minimally above that required to react with the aluminum chloride. The presence and concentration of titanium oxychloride may be measured by use of transmission filter Infrared spectroscopy, transmission Fourier Transform Infrared spectroscopy, Raman spectroscopy, and Attenuated Total Reflectance Infrared spectroscopy, and Attenuated Total Reflectance Fourier Transform Infrared spectroscopy in a frequency range of from 800 to 2000 $cm^{-1}$.

In the raw process stream from a chlorinator, for example, as much as 10% by weight of the material may be particulate material that scatters or absorbs light. It is recommended to use attenuated reflectance methods for measurements made on the raw process stream where particle concentrations are high. For accuracy and precision, it is most preferred to measure the presence and the concentration of titanium oxychloride by diamond based Attenuated Total Reflectance Fourier Transform Infrared at a frequency of about 820 $cm^{-1}$. Diamond based attenuated reflectance means that the infrared probe or detector placed in the process stream has a diamond element. Suitable probe units include those manufactured by ASI Applied Systems of Millersville, Md., Axiom Analytic, Inc. of Irvine, Calif. and others.

The probe or detector may be located in the immediate vicinity of the addition point for the aluminum chloride-passivating agent or downstream. Its actual location is not critical as long as it is located in an area where the temperature ensures that titanium oxychloride will be in solution. Measurement of the concentration of titanium oxychloride may also be made using transmission methods following the inline filtering or screening out of interfering particles. In a case where particle concentrations are less than a percent-or-so in the crude titanium tetrachloride, or are due only to the formation of the insoluble hydrolysis products on addition of water or a carboxylic acid; the presence of particles may be accommodated by the use of multiple scan averaging techniques.

In general the operation of the present invention may be described by the illustrated control loop of the FIGURE. The control loop comprises a control devise, a feedback controller, and an analyzer. The analyzer includes the signal generator (frequency range of from 800 to 2000 $cm^{-1}$), and detector. The analyzer measures the concentration of titanium oxychloride downstream from the point of addition of the passivating agent. The analyzer produces an output signal representing the measured concentration of titanium oxychloride. This output signal is sent to the feedback controller. There the concentration of the titanium oxychloride measured by the analyzer is compared to the predetermined aim point. The feedback controller, based on this comparison, provides input to the control device to adjust the addition rate of the passivating agent to restore or maintain the concentration of the titanium oxychloride at the aim point. Algorithms used in the analyzer and the feed back controller to convert the data collected to a signal output are not critical. One skilled in this art can select or design an algorithm suitable to the specific type of analyzer or feedback controller. The control device may be any regulated flow device equipped with an automatic actuator. Typically the control device is a valve.

The present process allows both to minimize the yield loss of titanium value while at the same time controlling of the passivation of aluminum chloride. By introducing the passivation agent into the chlorinator discharge stream where the stream comprises predominately vapor, liquid mist and solids one can accurately and efficiently control the addition of a passivating agent in real time by monitoring the concentration of titanium oxychloride present in the crude titanium tetrachloride formed on the addition of the passivating agent. The present control loop responds rapidly to variations in the aluminum chloride content of the crude titanium tetrachloride indirectly by comparing the concentration of titanium oxychloride present at a certain time with the concentration selected as the aim point. It is desirable to set the aim point at the lowest reliable concentration of titanium oxychloride that is detected by the analytical detection devise used in the control loop. The rate of addition of the passivating agent is automatically adjusted to compensate for any increase or decrease of the titanium oxychloride that results from the increase or decrease in the aluminum chloride present in the crude titanium tetrachloride.

Any suitable analytical detection method may be used in the present invention. As stated above, it is most preferred to monitor at a frequency of 820 $cm^{-1}$ using the Fourier Transform infrared method. This provides sensitivity and precision for the in-process measurements in the presence of high concentrations of particles. Using this technique titanium oxychloride in concentrations as low as 0.1% may be reliably measured.

The control loop of the present invention provides a means to reduce the addition of water or other passivating agents to an amount minimally in excess of that needed to react with all the aluminum chloride present. The resulting reductions in corrosion and deposition of aluminum containing solids in the present process are equivalent to methods of the prior art; yet, at the same time, the present process allows real time, on-aim process control with controlled addition of water or other aluminum chloride-passivating agent to substantially reduce the loss of titanium value.

The present invention provides a real-time, in-process passivation control at an aim point. The present control loop that is fast and is responsive to the demands of continuous in-process operation. The control loop responds in real-time to control the addition of the passivating agent where there are variations in the aluminum chloride content of the crude titanium tetrachloride due to (1) variations in the uniformity in the distribution of the aluminum containing minerals in the ore being processed; (2) variations in the rate at which ore is processed; (3) variations in aluminum content from one ore source to another; and (4) variation in the content of mineral species other than those containing aluminum and titanium that consume the passivating agent. The present real-time control loop combined with the location of the addition of the passivating agent minimizes both the losses of titanium value from titanium tetrachloride reaction with excess concentrations of passivating agent and losses of service time from corrosion of equipment and the formation of unwanted deposits.

What is claimed is:

1. An in-process, real-time control loop capable of controlling the passivation of aluminum chloride formed in the chlorination of titanium-containing ores by monitoring titanium oxychloride present in passivated crude titanium tetrachloride comprising the steps:

(a) mixing into a chlorinator discharge stream, where the stream comprises predominately vapor in the presence of liquid mist and solids, an aluminum chloride-passivating agent to form in the process stream an essentially non-corrosive aluminum containing compound, and titanium oxychloride;

(b) measuring in-process the concentration of titanium oxychloride in the chlorinator discharge stream or in the crude titanium tetrachloride;

(c) comparing the measured concentration of titanium oxychloride to that of an aim point concentration of titanium oxychloride; and (d) adjusting the rate of addition of the aluminum chloride-passivating agent to restore or maintain the concentration of titanium oxychloride at the aim point.

2. The process of claim 1 wherein the aluminum chloride-passivating agent is selected from the group consisting of water, water containing solutions, water containing mixtures, and carboxylic acids.

3. The process of claim 1 wherein the concentration of titanium oxychloride is measured by an optical method selected from the group consisting of transmission filter Infrared spectroscopy, transmission Fourier Transform Infrared spectroscopy, Raman spectroscopy, Attenuated Total Reflectance Infrared spectroscopy, and Attenuated Total Reflectance Fourier Transform Infrared spectroscopy.

4. The process of claim 3 wherein the measurement of the concentration of titanium oxychloride is made within a frequency range of from 800 to 2000 $cm^{-1}$.

5. The process of claims 1 or 3 wherein the concentration of titanium oxychloride is measured by diamond based Attenuated Total Reflectance Fourier Transform Infrared at a frequency of about 820 $cm^{-1}$.

* * * * *